(12) United States Patent
Delsuc et al.

(10) Patent No.: US 9,571,583 B2
(45) Date of Patent: Feb. 14, 2017

(54) METHOD OF COMMUNICATING BETWEEN TWO DEVICES

(71) Applicant: GEMALTO SA, Meudon (FR)

(72) Inventors: Julien Delsuc, Marseilles (FR); Sylvain Chafer, Roquevaire (FR)

(73) Assignee: GEMALTO SA, Meudon (FR)

( * ) Notice: Subject to any disclaimer, the term of this patent is extended or adjusted under 35 U.S.C. 154(b) by 0 days.

(21) Appl. No.: 15/028,321

(22) PCT Filed: Oct. 7, 2014

(86) PCT No.: PCT/EP2014/071405
§ 371 (c)(1),
(2) Date: Apr. 8, 2016

(87) PCT Pub. No.: WO2015/062822
PCT Pub. Date: May 7, 2015

(65) Prior Publication Data
US 2016/0255156 A1 Sep. 1, 2016

(30) Foreign Application Priority Data

Oct. 30, 2013 (EP) .................................... 13306479

(51) Int. Cl.
*G06F 15/177* (2006.01)
*H04L 29/08* (2006.01)
*H04W 4/00* (2009.01)

(52) U.S. Cl.
CPC ......... *H04L 67/125* (2013.01); *H04L 67/2838* (2013.01); *H04L 67/34* (2013.01); *H04W 4/005* (2013.01)

(58) Field of Classification Search
CPC ....... H04L 69/161; H04L 69/163; H04L 69/32
(Continued)

(56) References Cited

U.S. PATENT DOCUMENTS

| 6,246,752 B1 * | 6/2001 | Bscheider | G11B 31/00 |
| | | | 379/111 |
| 2004/0185931 A1 * | 9/2004 | Lowell | G07F 17/329 |
| | | | 463/17 |

(Continued)

FOREIGN PATENT DOCUMENTS

WO   WO 2013/142139 A2   9/2013

OTHER PUBLICATIONS

"Machine to Machine Communication (M2M); Use cases of M2M applications for Connected Consumer", ETSI TR 102 857 V0.3.0, Jun. 4, 2010, pp. 1-22, European Telecommunications Standards Institute (ETSI), France.

(Continued)

*Primary Examiner* — El Hadji Sall
(74) *Attorney, Agent, or Firm* — Buchanan Ingersoll & Rooney PC

(57) ABSTRACT

The invention is a method of communicating between a caller device and an executor device wherein the executor device comprises a memory having a layout which defines formats and addresses used for storing data in the memory. The executor device comprises an application including a service and the method comprises the steps of:
  providing the caller device with the layout and an indicator reflecting the service during the handshake phase,
  sending to the executor device a data block corresponding to a command targeting the service, wherein the data block complies with the layout and is devoid of metadata,
  sending to the caller device a response block which complies with the layout and which corresponds to a result generated by execution of the command.

6 Claims, 2 Drawing Sheets

(58) Field of Classification Search
USPC .................................. 709/220, 200, 226, 227
See application file for complete search history.

(56) References Cited

U.S. PATENT DOCUMENTS

2011/0107379 A1* 5/2011 Lajoie ................. H04L 65/4076
725/87
2012/0307764 A1   12/2012 Zhao et al.
2013/0203412 A1   8/2013  Starsinic et al.

OTHER PUBLICATIONS

International Search Report (PCT/ISA/210) mailed on Nov. 11, 2014, by the European Patent Office as the International Searching Authority for International Application No. PCT/EP2014/071405.
Written Opinion (PCT/ISA/237) mailed on Nov. 11, 2014, by the European Patent Office as the International Searching Authority for International Application No. PCT/EP2014/071405.

* cited by examiner

METHOD OF COMMUNICATING BETWEEN TWO DEVICES

FIELD OF THE INVENTION

The present invention relates to methods of communicating between two devices. It relates particularly to methods of communicating between a device providing access to a service and a device intended to use the service.

BACKGROUND OF THE INVENTION

Many devices have the capability to deliver one or several services to another connected machine. Such devices may have either limited functions or limited resources. They may require to be controlled by complex applications run on a computer or on dedicated control circuits. Such devices may be deployed in the domain of the Internet of Things or in the domain of Machine-To-Machine (M2M). There is a great heterogeneity in the technologies used for these domains. For example devices may use different transport protocols (e.g. TCP/IP, Bluetooth, HTTP or Zigbee), different network topologies (e.g. with or without gateway) and different business patterns which depend on the kind of provided service (e.g. metering, video surveillance, weather measurement or home automation). Thus, the deployment of such devices remains complex and is not as wide as it could be.

There is a need for improving the way to manage communication between devices deployed in these domains.

SUMMARY OF THE INVENTION

An object of the invention is to solve the above mentioned technical problem.

The object of the present invention is a method of communicating between a caller device and an executor device. The executor device comprises a memory having a layout which defines formats and addresses used for storing data in the memory. The executor device comprises at least an application including a service. The method comprises the following steps:
  an handshake phase where the executor device sends to the caller device the layout and an indicator reflecting the service,
  sending to the executor device a data block corresponding to a command targeting the service, the data block being compliant with the layout and being devoid of metadata, and
  sending to the caller device a response block which complies with the layout and which corresponds to a result generated by execution of the command.

Advantageously, the executor device may spontaneously send a message to the caller device when a preset event occurred into the executor device after said handshake phase.

Advantageously, the service may provide access to a measured physical value and the executor device may be a Machine-to-Machine device.

Another object of the invention is an executor device comprising a memory having a layout which defines formats and addresses used for storing data in the memory. The executor device comprises an application including a service which may be accessed by a command received from a caller device through a transport layer. The executor device comprises an application framework adapted to install and to activate the application. The executor device is configured to send to the caller device, during an handshake phase, the layout and an indicator reflecting the service. The executor device includes a stack placed between the application framework and the transport layer. This stack comprises a link abstraction layer and dispatcher layer. The link abstraction layer is adapted to receive from the caller device a data block compliant with the layout and devoid of metadata, the data block corresponding to the command. The link abstraction layer is adapted to send to the caller device a response block compliant with the layout and corresponding to the result of the execution of the command. The link abstraction layer is configured to communicate with the dispatcher layer through a unique communication interface and to communicate with the transport layer through a plurality of communication interfaces. The dispatcher layer is adapted to retrieve the command from the data block, to send the command to the application, to retrieve the corresponding response block from the application and to send the response block to the link abstraction layer. The dispatcher layer works according to an asynchronous communication mode.

Advantageously, the executor device may be adapted to spontaneously send a message to the caller device when a preset event occurred into the executor device after said handshake phase.

Another object of the invention is a system comprising a caller device and the executor device of the invention, wherein the caller device comprises a client application adapted to access the service of the executor device by sending a command through the transport layer. The caller device comprises a second application framework adapted to install and to activate the client application. The caller device comprises a second stack placed between the second application framework and the transport layer. The second stack comprises a second link abstraction layer and a second dispatcher layer. The second link abstraction layer is adapted to send to the executor device the data block. The second link abstraction layer is adapted to receive from the executor device the response block. The second dispatcher layer is adapted to forward the command from the second application framework to the second link abstraction layer and to forward the response block from the second link abstraction layer to the client application through the second application framework. The second dispatcher layer works according to an asynchronous communication mode.

Advantageously, the service may have its own communication interface and both the caller device and the executor device may have access to a specification of the communication interface of the service. The service may be coupled with a stub allowing the service to communicate with the application framework. The client application may be coupled with a proxy allowing the client application to communicate with the second application framework. Both the stub and the proxy may have been automatically generated using said specification.

Advantageously, the response block may be built by the stub.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to any types of devices intended to provide access to a service to another device.

Figure 1:
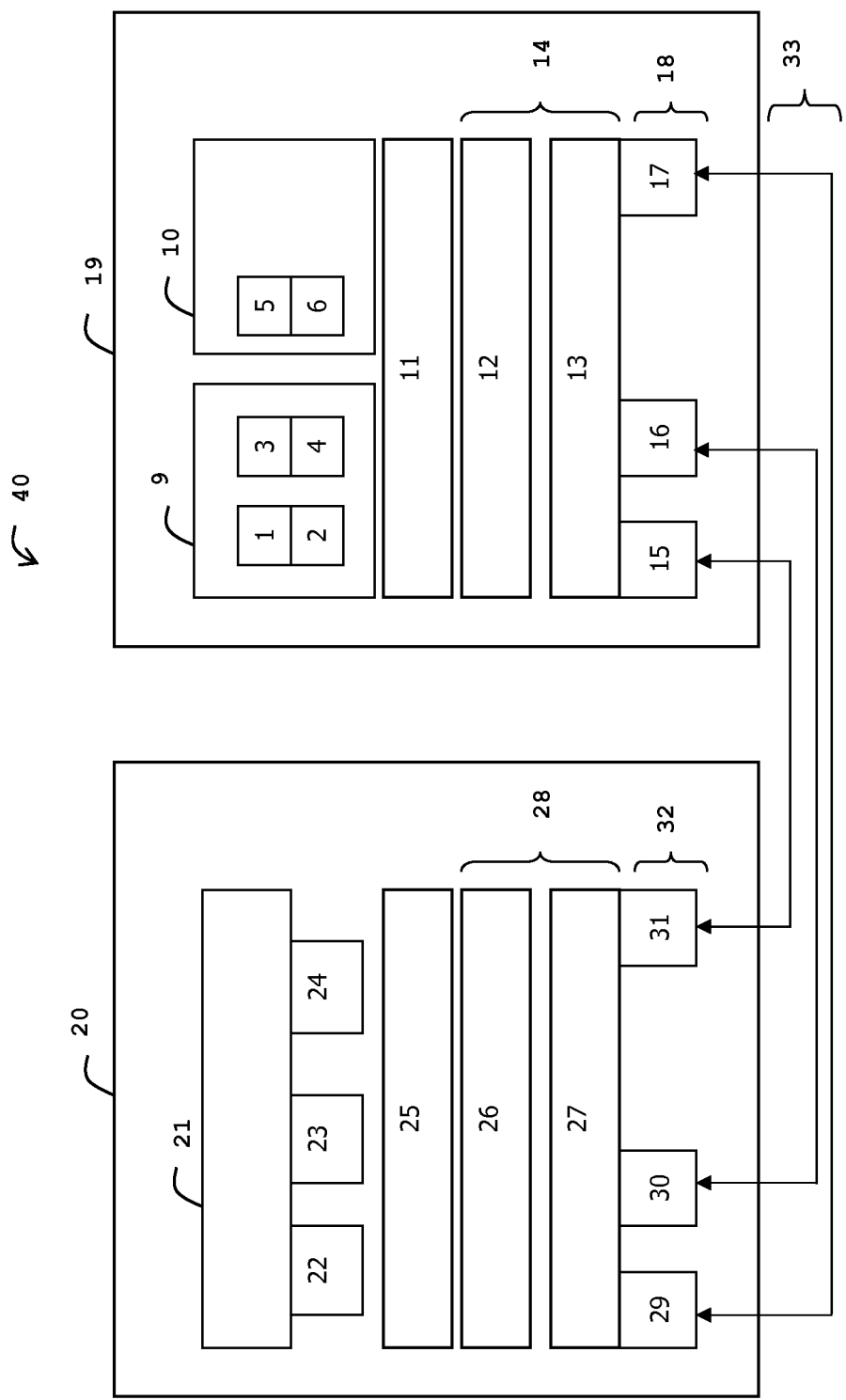
FIG. 1 is an example of a system comprising two devices intended to communicate according to the invention.

FIG. 1 shows an example of a system 40 comprising a caller device 20 and an executor device 19 according to the invention.

In this example, the executor device 19 is a M2M device able to measure the temperature. The caller device 20 is a server able to get and to monitor the temperature measured by the executor device 19.

The executor device 19 comprises a memory (not shown) having a layout which defines formats and addresses used for storing data in the memory.

The executor device 19 comprises two applications 9 and 10. For instance, the application 9 is dedicated to the weather tracking while the application 10 is dedicated to home automation. The application 9 includes a first service 1 able to provide the measured temperature and a second service 2 able to provide the measured wind velocity.

The application 9 includes a stub 2 coupled to the service 1 and a stub 4 coupled to the service 3. These stubs are designed as access point to reach the services of the application 9.

The application 10 includes a service 5 able to monitor the central heating. The application 10 includes a stub 6 linked to the service 5. The stub is designed as access point to reach the service 5.

Advantageously, the applications 9 and 10 are developed as software components. The may be run by a virtual machine.

The executor device 19 is configured to receive commands from the caller device 20 through a transport layer 33. The transport layer 33 may rely or any combination of private and public communication networks.

The executor device 19 comprises an application framework 11 adapted to install and to activate the applications 9 and 10.

The executor device 19 is configured to send to the caller device 20, during a handshake phase, the layout and an indicator reflecting the service 1.

The executor device 19 includes a stack 14 placed between the application framework 11 and the transport layer 33. This stack 14 comprises a link abstraction layer 13 and dispatcher layer 12. The link abstraction layer 13 is adapted to receive from the caller device 20 a data block which is compliant with the layout and which is devoid of metadata. The data block corresponds to a command targeting the service 1. The link abstraction layer 13 is adapted to send to the caller device 20 a response block compliant with the layout and corresponding to the result of the command execution. The link abstraction layer 13 is also adapted to spontaneously send to the caller device 20 an event message compliant with the layout. In other words, the link abstraction layer 13 may take initiative to send an event message which is not a response to a command. The link abstraction layer 13 is configured to communicate with the dispatcher layer 12 through a unique communication interface and to communicate with the transport layer 33 through a plurality of communication interfaces. Thus the link abstraction layer 13 allows masking the diversity of communication protocols which may be used for conveying data through the transport layer 33.

The dispatcher layer 12 is adapted to retrieve the command from the data block, to send the command to the application which corresponds to the targeted service, to retrieve the response block from this application and to send the response block to the link abstraction layer 13.

The dispatcher layer 12 works according to an asynchronous communication mode.

The executor device 19 includes a set 18 of drivers 15, 16 and 17 which correspond to as many type of communication protocol. For instance, the driver 15 may allow communicating through the transport layer 33 using HTTP or HTTPS, the driver 16 may allow communicating through the transport layer 33 using Bluetooth and the driver 17 may allow communicating through the transport layer 33 using Zigbee.

The caller device 20 comprises a client application 21 which is configured to use the service 1 of the executor device 19 by sending a command through the transport layer 33. The caller device 20 comprises its own application framework 25 adapted to install and to activate the client application 21.

The caller device 20 includes its own stack 28 placed between the application framework 25 and the transport layer 33. The stack 28 comprises a link abstraction layer 27 and a dispatcher layer 26.

The link abstraction layer 27 is adapted to send to the executor device 19 a data block comprising a command and to receive from the executor device 19 a response block comprising a result corresponding to the data block.

The dispatcher layer 26 is adapted to forward the command from the application framework 25 to the link abstraction layer 27 and to forward the corresponding response block from the link abstraction layer 27 to the client application 21 through the application framework 25. The dispatcher layer 26 works in asynchronous communication mode.

The caller device 20 includes a set 32 of drivers 29, 30 and 31 which correspond to as many type of communication protocol which may be used for communicating through the transport layer 33. For instance, the driver 29 may be able to handle HTTP or HTTPS, the driver 30 may be able to handle Bluetooth and the driver 31 may be able to handle Zigbee.

Both devices are able to communicate together as they share a common type of driver.

Both link abstraction layers 13 and 27 are configured to manage the connection phase, including the handshake and communication session establishment.

The caller device 20 includes three proxies 22, 23 and 24 placed at the interface between the client application 21 and the application framework 25. At least one of these proxies corresponds to a particular stub of the executor device 19, so that the client application 21 may send commands to a service of the executor device 19. For instance the proxy 22 may be designed for being able to communicate with the stub 2.

Each service of the executor device has its own communication interface. Both devices have access to a specification of these communication interfaces. For instance, the specification may be defined through an XML (Extensible Markup Language) file using the IDL (Interface Definition Language).

This IDL supports object oriented concepts such as inheritance and aggregation. It is totally independent from target generation language.

It allows defining following items: services with a unique identifier (e.g. package+name+version) and complex types (e.g. structures and arrays). Each of those services is able to contain zero or more functions, zero or more events and zero or more properties.

Each function has got zero or more parameters, and can return zero to 1 value (that can be complex type), each event has got zero or more parameters. Each property can be read only or not, and can be source of events or not.

The parameters can be of any define type (e.g. primitive type or complex type)

Advantageously, both proxies and stubs are automatically generated from the specification by a tool named generator.

Preferably, the generator is modular, having one module per target. A target is a defined by the triplet: [caller or executor]+[language]+[platform (OS or virtual machine or application framework)].

Figure 2:
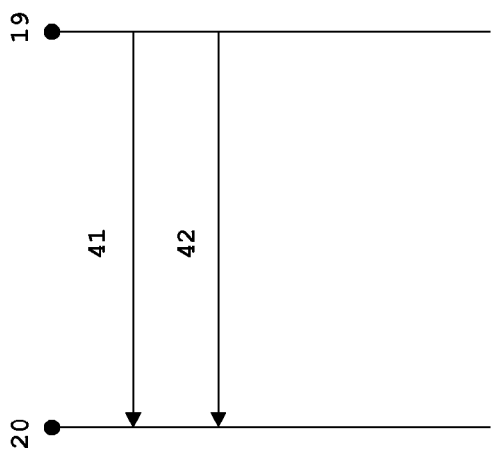
FIG. 2 is an example of messages exchanged during the handshake phase between the devices according to the invention.

FIG. 2 shows an example of messages exchanged during the handshake phase between the caller device 20 and the executor device 19 according to the invention.

The executor device 19 sends its layout 41 to the caller device 20. Then the executor device 19 sends an indicator 42 reflecting the availability of the service 1 to the caller device 20.

Alternatively, the executor device 19 may send the layout 41 and the indicator 42 to the caller device 20 via a single message.

The layout defines for example the endianess of numerical values, the way those numerical values are aligned in memory, the size of a pointer and the way structures are padded.

The indicator 42 may be managed through a service registry. For instance, this registry may be a TLV (Tag-Length-Value) structure defining the list of applications and the services they export. Each service can be instantiated several times inside one application.

This indicator allows the caller to adapt itself to the devices it connects to in a plug'n play fashion.

Figure 3:
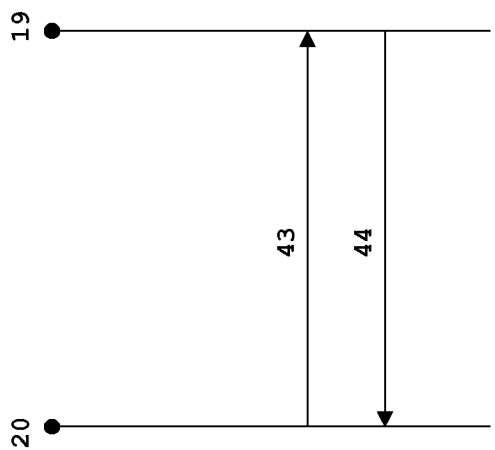
FIG. 3 is an example of messages exchanged between the devices for accessing a service according to the invention.

FIG. 3 shows an example of messages exchanged between the devices for accessing a service according to the invention.

These messages are assumed to be exchanged after the handshake phase of FIG. 2.

The caller device 20 sends a data block 43 corresponding to a command targeting the service 1. The data block 43 complies with the layout 41 and is devoid of metadata. In other words, the data block 43 is generated to have a minimum size. Then the command is retrieved by the executor means and provided to the relevant service which executes the command. Then the service provides its associate stub with the result of the command and the stub generate a response block 44 containing the result. The response block 44 complies with the layout 41 and is devoid of metadata. Then the executor device 19 sends the response block 44 to the caller device 20. The response block 44 is delivered to the relevant proxy which retrieves the result from the response block 44.

The command is sent in an asynchronous way along with a request identifier ID. This request identifier ID must be present in the response so the dispatcher can redirect the response to the command sender.

Finally the result is delivered to the client application 21 which may use the result of the command. For example the client application may get a log of the measured temperatures for the last 24 hours.

Figure 4:
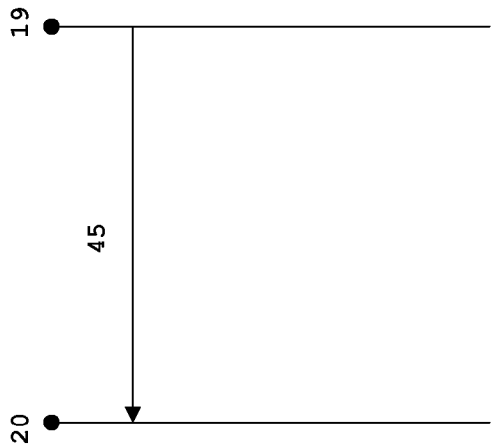
FIG. 4 is an example of message spontaneously exchanged between the devices according to the invention.

FIG. 4 shows an example of a message spontaneously exchanged between the devices according to the invention.

This message is assumed to be exchanged after the handshake phase of FIG. 2.

The executor device 19 is assumed to be configured to detect a predetermined event. For instance, the executor device 19 may be able to detect that the measured temperature is higher than a preset threshold. In this case, the executor device 19 spontaneously generates a message 45 and sends it to the caller device 20. This asynchronous mechanism allows the caller device to receive information without a heavy and consuming polling system. The message 45 is generated as a block complying with the layout 41.

Thanks to the invention, the message exchanged between the devices are binary encoded and require only a low bandwidth.

Thanks to the invention, there is no need of using a pivot language, thus the RAM footprint is as small as possible.

Although the used command/respond scheme is similar to the Remote Procedure call (RPC) mechanism, the executor device can spontaneously send message to the caller device in an asynchronous way.

Thanks to the invention, the applications in both devices remain independent of the transport layer.

Thanks to the invention, a device abstraction is provided and the applications do not have to take into account the constraints related to the physical interfaces of each device.

It must be understood, within the scope of the invention, that the above-described embodiments are provided as non-limitative examples. In particular, the executor device may comprise several applications including a plurality of services. A device may be both a caller device and an executor device. The invention apply to any kind of device like a computer, a Tablet PC, a mobile phone, a server, a M2M module or a machine comprising a set of sensors. The communication between both devices may be secured by any security mechanism. For instance, the device may use a mutual authentication scheme and encipher the exchanged data.

The invention claimed is:

1. An executor device comprising a memory managed through a memory layout which defines formats and addresses used for storing data in the memory, said executor device comprising an application including a service which may be accessed by a command received from a caller device through a transport layer said executor device comprising an application framework adapted to install and to activate the application, wherein the executor device is configured to send to the caller device, during an handshake phase, the memory layout and an indicator reflecting the service, and wherein said executor device includes a stack placed between the application framework and the transport layer, said stack comprising a link abstraction layer and dispatcher layer, wherein said link abstraction layer is configured to receive from the caller device a data block compliant with the memory layout and devoid of metadata, said data block corresponding to the command, said link abstraction layer being configured to send to the caller device a response block compliant with the memory layout and corresponding to the result of the command, said link abstraction layer being configured to communicate with the dispatcher layer through a unique communication interface and to communicate with the transport layer through a plurality of communication interfaces, wherein said dispatcher layer is configured to retrieve the command from the data block, to send the command to the application, to retrieve the response block from the application and to send the response block to the link abstraction layer, and wherein said dispatcher layer is configured to work according to an asynchronous communication.

2. An executor device according to claim 1, wherein the memory layout defines at least one of the following: the endianess of numerical values stored in the memory, the way the numerical values stored in the memory are aligned in memory, the size of pointers used to access the memory and the way structures stored in the memory are padded.

3. An executor device according to claim 1, wherein the executor device is configured to spontaneously send a message to the caller device when a preset event occurred into the executor device after said handshake phase.

4. A system comprising the caller device and the executor device of claim 1, wherein the caller device comprises a client application configured to access the service of the executor device by sending a command through the transport layer, wherein the caller device comprises a second application framework adapted to install and to activate the client application, and wherein the caller device includes a second stack placed between the second application framework and the transport layer said second stack comprising:

a second link abstraction layer configured to send to the executor device the data block, said second link abstraction layer being configured to receive from the executor device the response block, a second dispatcher layer configured to forward the command from the second application framework to the second link abstraction layer and to forward the response block from the second link abstraction layer to the client application through the second application framework, said second dispatcher layer operating according to an asynchronous communication.

5. A system according to claim 4, wherein the service has a communication interface, wherein both the caller device and the executor device have access to a specification of the communication interface of the service, wherein the service is coupled with a stub allowing the service to communicate with the application framework, wherein the client application is coupled with a proxy allowing the client application to communicate with the second application framework and wherein both the stub and the proxy are automatically generated using said specification.

6. A system according to claim 5, wherein the response block is built by the stub.

* * * * *